(12) United States Patent
Janssen

(10) Patent No.: US 6,501,223 B2
(45) Date of Patent: Dec. 31, 2002

(54) DEVICE AND METHOD FOR DEMAGNETIZING THE SHIELDING OF A COLOR DISPLAY DEVICE

(75) Inventor: Erik Janssen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/968,999

(22) Filed: Oct. 2, 2001

(65) Prior Publication Data

US 2002/0101202 A1 Aug. 1, 2002

(30) Foreign Application Priority Data

Oct. 5, 2000 (EP) .............................. 00203463

(51) Int. Cl.$^7$ ............................................. H01J 29/06
(52) U.S. Cl. ............................................. 315/8; 315/85
(58) Field of Search ........................................ 315/8, 85

(56) References Cited

U.S. PATENT DOCUMENTS

| 4,617,603 A | 10/1986 | Johnson et al. ............. 361/149 |
| 5,367,221 A * | 11/1994 | Santy et al. ................... 315/8 |
| 5,559,401 A | 9/1996 | De Wit .......................... 315/8 |

* cited by examiner

Primary Examiner—David Vu

(57) ABSTRACT

The present invention relates to a color display device comprising a color display tube (1) with a front portion having a truncated cone (3), an element (5) for generating a plurality of electron beams, a shielding (9) of ferromagnetic material extending substantially parallel to the truncated cone (3), and a demagnetizing device having at least two demagnetizing coils (11,12) extending along the outer circumference of the cone (3). The demagnetizing device is arranged to energize the coils (11,12) simultaneously and with a phase difference, resulting in the generation of a rotating magnetic field. As the magnetic field rotates, it can be arranged to substantially coincide with the shape of the shielding (9), resulting in a magnetic field that is parallel to the shielding (9) over a larger part of the shielding surface. This improves the demagnetizing procedure, leading to a better landing performance of the electron beams.

7 Claims, 3 Drawing Sheets

DEVICE AND METHOD FOR DEMAGNETIZING THE SHIELDING OF A COLOR DISPLAY DEVICE

FIELD OF THE INVENTION

The present invention relates to a color display device comprising a color display tube with a front portion having a truncated cone, means for generating a plurality of electron beams, a shielding of ferromagnetic material extending substantially parallel to the truncated cone, and a demagnetizing device having at least two demagnetizing coils extending along the outer circumference of the cone.

The invention also relates to a method for demagnetizing the shielding of a display device, so called degaussing.

BACKGROUND OF THE INVENTION

A color display device of this type is well known in the art. The purpose of the shielding of ferromagnetic material is to reduce the effect of the earth's magnetic field on the picture display. Without this shielding, the electron beams are affected by the earth's magnetic field, causing errors in the landing of the beams.

When the display is switched on, the screen is demagnetized by means of an alternating current with decreasing amplitude, which current is led through the coils arranged on the wall of the display tube, creating a magnetic field. Due to this treatment, the magnetization of the shielding is adapted to the prevailing direction of the earth's magnetic field.

A problem with this type of demagnetization (also called degaussing) is that part of the shielding is not demagnetized, or insufficiently demagnetized, because the applied field is not parallel to the shielding. In fact, the field resulting from the two coils approximately takes on the shape shown in FIG. 1, and is clearly perpendicular to large parts of the shielding.

To solve this problem, U.S. Pat. No. 5,559,401 teaches a color display device wherein two coils are energized at different times. Through this solution, the shielding is demagnetized in two possibly overlapping "shots", resulting in the different magnetic fields illustrated in FIGS. 2a–c. Although the performance is significantly improved with this technique, there are still areas of the shielding that are not satisfactorily demagnetized, especially the corners.

SUMMARY OF THE INVENTION

It is an object of the present invention to provide a display device of the kind described by way of introduction, having an improved landing performance. A further object of the invention is to generate a degaussing magnetic field, which is substantially parallel to a larger part of the shielding surface.

To this end, the device according to the invention is characterized in that the demagnetizing device is provided with means for energizing the coils in a phase-shifted manner, resulting in a rotating magnetic field. The rotating field can be arranged to substantially coincide with the shape of the shielding, resulting in a magnetic field, which is parallel to the shielding over a larger part of the shielding surface. This improves the demagnetizing procedure, leading to better landing performance of the electron beams.

The coils are preferably connected in parallel with a common power source. As the rotating field ensures a satisfactory demagnetization, there is no need for two separate power sources.

The coils can be identical, with at least one of the coils being connected in series with a capacitor and/or a inductor. The capacitor or inductor affects the reactance in one of the branches connected in parallel, resulting in a phase difference.

Alternatively, the coils can have different electrical properties, including different reactance. While requiring different types of demagnetizing coils, the need for extra circuit components, such as capacitors, is eliminated. The different electrical properties can easily be achieved by using coils with a different number of windings, or a different wire diameter.

According to another aspect of the invention, a method for demagnetizing a shielding in a color display device of the above kind is characterized by energizing said coils simultaneously and with a phase difference, thereby generating a rotating magnetic field.

BRIEF DESCRIPTION OF THE DRAWINGS

These and other aspects of the invention will be apparent from and elucidated with reference to the preferred embodiments described with reference to the appended drawings.

DETAILED DESCRIPTION OF THE INVENTION

Figure 1:
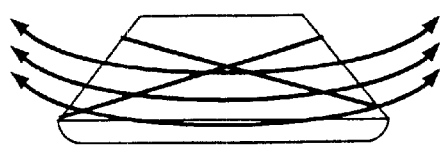
FIG. 1 illustrates a degaussing field in a display device according to the prior art.
Figure 2A:
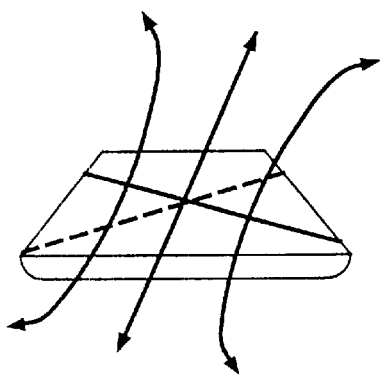
FIGS. 2a–2c illustrate a degaussing field in a display device according to the prior art.
Figure 2B:
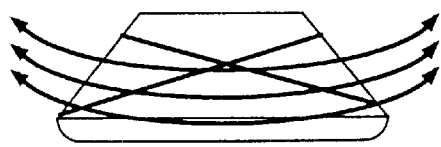
Figure 2C:
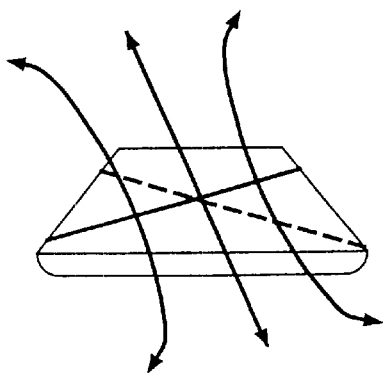
Figure 3:
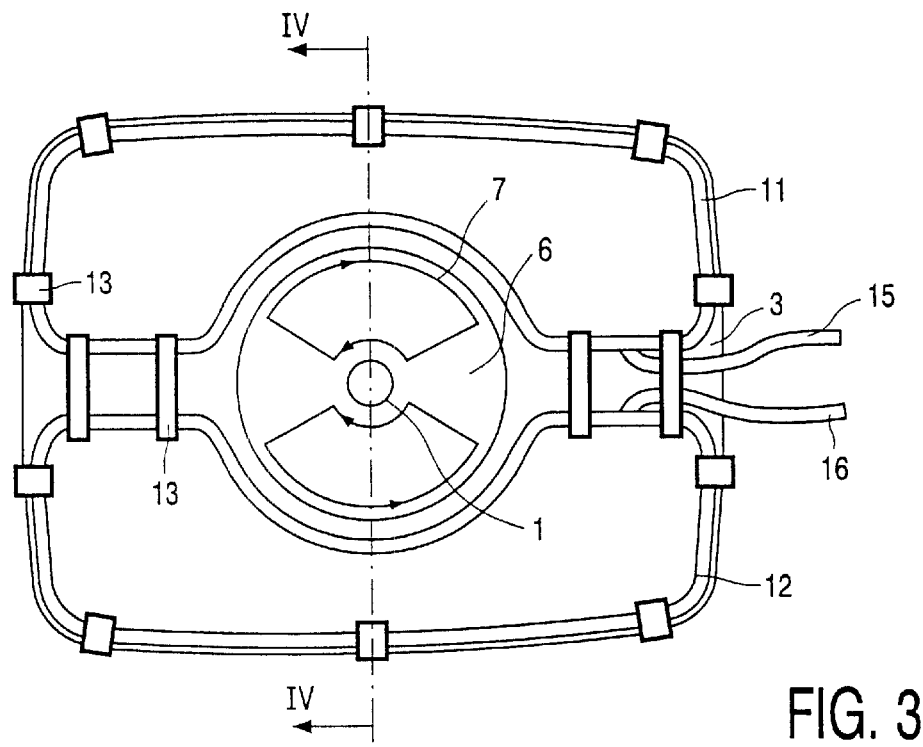
FIG. 3 is a rear view of a television display tube provided with a demagnetization device according to the invention.
Figure 4:
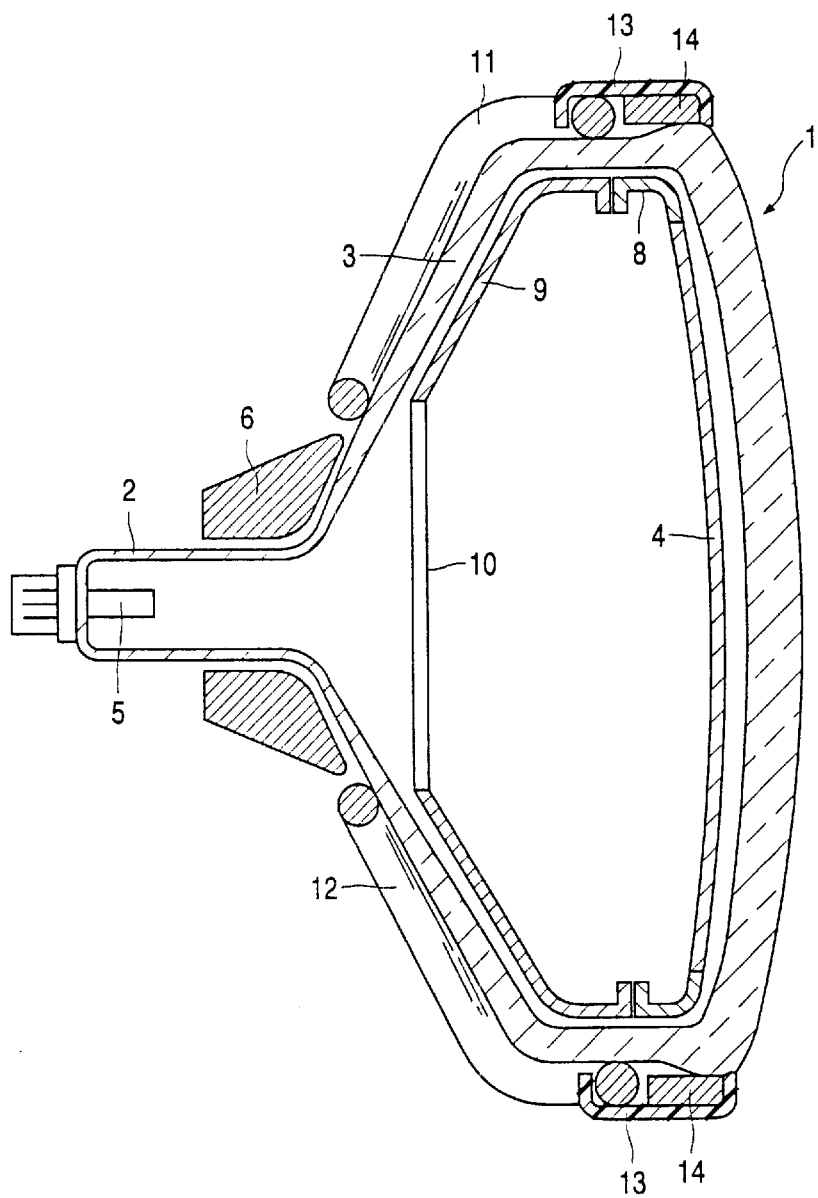
FIG. 4 is a longitudinal sectional view of the display tube in FIG. 3, taken on the line IV—IV.

FIGS. 3 and 4 are a rear view and a longitudinal sectionial view, respectively, of a color television display tube with a demagnetizing device. For the sake of clarity, all details which are not important for the understanding of the invention have been omitted.

The display tube 1 comprises a cylindrical neck 2 and a truncated cone 3, whose widest part is present at the front side of the tube, and is provided with a color selection electrode 4 and a display screen (not shown).

The color selection electrode 4 has a pattern of apertures. The display screen has a pattern of phosphor elements which, when electrons are incident thereon, luminesce in one of the colors red, green or blue. The rear part of the neck accommodates three electron guns 5 (shown schematically). At the area of the transition between neck and cone, a deflection unit 6 (shown schematically) is provided on the tube, which unit comprises control deflection coils 7, for deflecting the electron beams in the horizontal and vertical direction. As shown in FIG. 3, the deflection coils 7 may be e.g. saddle-shaped coils through which a sawtooth-shaped current flows during operation. By way of example, the frequency can be approximately 16–32 kHz for the horizontal deflection, and 50–100 Hz for the vertical deflection.

The color selection electrode 4 is suspended from a frame 8, which is secured to the tube with means that are not shown. A magnetic shield 9 is also secured to this frame, which shield extends along a large part of the inner surface of the cone. The shield 9, the frame 8, and the color selection electrode 4 are made of a material having a high magnetic permeability so that they jointly constitute a magnetic circuit within the cone with the exception of an aperture 10 provided in the shield 9 for passing the electron beams. This magnetic circuit is referred to as a "shielding" and it is this shielding that should be demagnetized for achieving optimal landing performance of the electron beams.

To accomplish this demagnetization, two demagnetizing coils 11, 12 are arranged at the outer side of the cone. The demagnetizing coils are secured by means of hooks 13 of a synthetic material to a metal tightening strap 14 enclosing the front part of the cone and to each other. The demagnetizing coils extend forward as far as the front boundary of the surface of the cone, and backward as far as the deflection unit allows, so that they comprise a very large part of the cone surface. The demagnetizing coils can be connected to a power unit via connection wires 15, 16.

Figure 5:
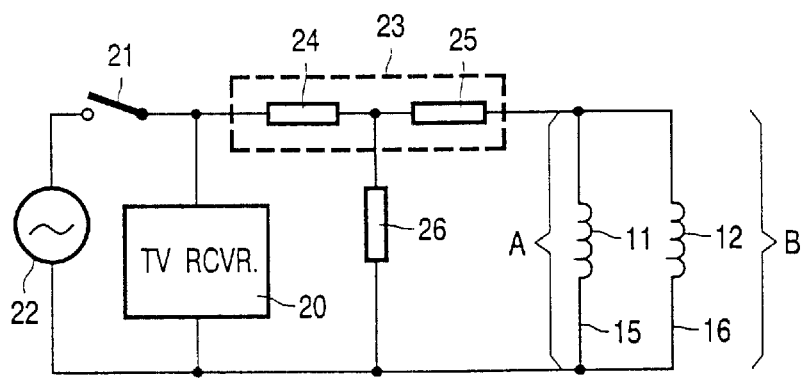
FIG. 5 is a diagram of a power circuit of the demagnetization device in FIG. 3.

A power supply circuit is shown diagrammatically in FIG. 5. A television receiver 20 is connected via a switch 21 to an AC voltage source 22, for example the mains. The two demagnetizing coils 11, 12 are connected in parallel with the switch 21 via the connection wires 15, 16 and a double thermistor 23. The double thermistor 23 comprises two thermally connected resistors 24 and 25 having a high positive temperature coefficient (PTC). After the switch is closed, a large current initially flows through the demagnetizing coils 11, 12, which current gradually decreases to a very low value when the resistors 24 and 25 warm up, so that the demagnetizing coils 11, 12 generate a decreasing magnetic field alternating with the mains frequency, which is necessary for the demagnetization of the shielding and its interior. To prevent that the resistors 24 and 25 cool down again after the current has decreased, a conducting resistor 26 is provided so that a sufficiently large current continues to flow through the resistors 24 and 25 to keep the double thermistor 23 at its temperature without a current of any significance flowing through the demagnetizing coils 11, 12.

Figure 6:
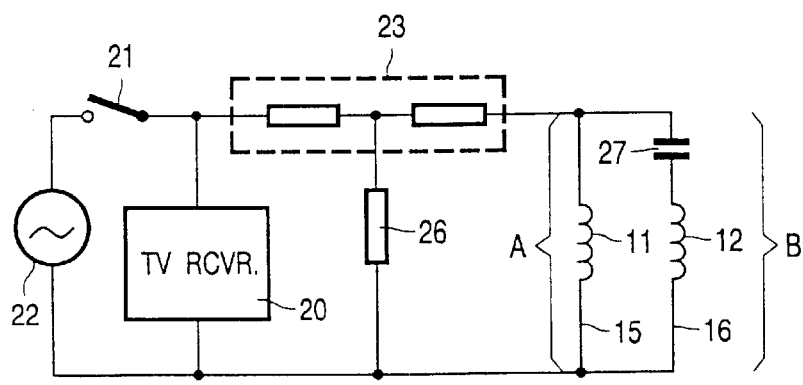
FIG. 6 is a segment of the circuit in FIG. 5 according to another embodiment of the invention.

In the devices hitherto known, where two demagnetizing coils are supplied by the same power circuit, two identical coils are arranged in series. According to the present invention however, the coils are connected in parallel, and arranged to generate magnetic fields with a phase difference. This is achieved by giving the circuit branches A and B in FIG. 5 different electrical properties, and especially different reactance. One simple and preferred way of accomplishing this is by using unidentical coils having a, for example, different wire diameter and a different number of windings. This can alternatively be achieved by introducing a capacitor 27 or inductor between the coils, as is illustrated in FIG. 6.

Figure 7:
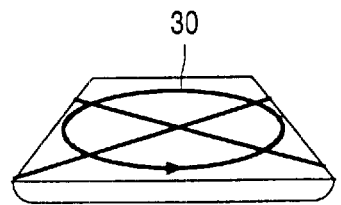
FIG. 7 illustrates a degaussing field in a display device according to the invention.

Due to the different reactance in branches A and B of the circuit, the currents that are made to flow through the coils will be out of phase with each other, thereby generating fields that are equally out of phase. The resulting combined field 30 will therefore rotate, in a way illustrated in FIG. 7. By adjusting the coil properties in a suitable way, a rotating field can be accomplished which very well follows the contour of the shielding inner surface.

By way of example, coils with 80 and 327 windings respectively can be used. Tests performed with coils of this type yielded satisfactory results.

It should be noted that the present invention is not limited to the above-described embodiments, and that several variations of the inventive idea presented in the appended claims may be realized by a man skilled in the art. For example, other ways of creating the phase difference can be used, such as connecting identical coils to different, phase-shifted power supplies. It is also obvious that the device and method according to the present invention can be combined with any known techniques, in order to achieve an even more efficient demagnetization.

What is claimed is:

1. Color display device comprising
   a color display tube (1) with a front portion having a truncated cone (3),
   means (5) for generating a plurality of electron beams,
   a shielding (9) of ferromagnetic material extending substantially parallel to the truncated cone (3), and
   a demagnetizing device having at least two demagnetizing coils (11,12) extending along the outer circumference of the cone (3), characterized in that said demagnetizing device is arranged to energize the coils simultaneously and with a phase difference, resulting in the generation of a rotating magnetic field.

2. Color display device according to claim 1, wherein said coils (11,12) are connected in parallel with a common power source (22).

3. Color display device according to claim 2, wherein said coils (11,12) are identical, and wherein at least one of said coils (12) is connected in series with a capacitor (27).

4. Color display device according to claim 2, wherein said coils (11,12) have different electrical properties, including different reactance.

5. Color display device according to claim 4, wherein said coils (11,12) have a different number of windings.

6. Color display device according to claim 4, wherein said coils (11,12) have a different wire diameter.

7. Method for demagnetizing a shielding (9) in a color display device comprising a demagnetizing device having at least two demagnetizing coils (11,12) extending along the outer circumference of the shielding (9), characterized by energizing said coils (11,12) simultaneously and with a phase difference, thereby generating a rotating magnetic field.

* * * * *